United States Patent [19]

Amblard et al.

[11] 4,288,008

[45] Sep. 8, 1981

[54] AGRICULTURAL SPREADER DEVICE OF MODULAR DESIGN FOR PULVERULENT MATERIAL

[76] Inventors: Jean-Louis Amblard, Bédillous Rte. de l'Aérodrome, 33250-Cissac (Gironde); Pierre M. Saintemarie, 33112-Saint Laurent du Médoc (Gironde), both of France

[21] Appl. No.: 95,432

[22] Filed: Nov. 19, 1979

[30] Foreign Application Priority Data

Nov. 24, 1978 [FR] France ................................ 78 33645

[51] Int. Cl.³ ............................................ G01F 13/00
[52] U.S. Cl. .................... 222/281; 222/414; 222/614; 222/623
[58] Field of Search ........ 222/414, 410, 281, 614–616, 222/619, 623–625; 239/664; 209/683, 689, 690

[56] References Cited

U.S. PATENT DOCUMENTS

| 504,718 | 9/1893 | Franke | 222/414 X |
|---|---|---|---|
| 2,030,541 | 2/1936 | Rose | 222/410 X |
| 2,603,383 | 7/1952 | Wilson | 222/414 X |
| 3,259,241 | 7/1966 | Hughes | 209/690 |
| 3,616,972 | 11/1971 | Christy | 222/414 X |
| 3,788,529 | 1/1974 | Christy | 222/414 |

*Primary Examiner*—Allen N. Knowles
*Attorney, Agent, or Firm*—Michael Ebert

[57] ABSTRACT

An agricultural spreader device for spreading seed and other granular material, the spreader being constituted by modular assemblies which are attachable to a central carrier assembly mountable on an agricultural machine such as a tractor. Each modular assembly includes a cylinder supported by rollers, the amount of material spread being determined by the adjustment of the cylinder speed. The lower opening of a distribution hopper is located in front of the cylinder top.

14 Claims, 13 Drawing Figures

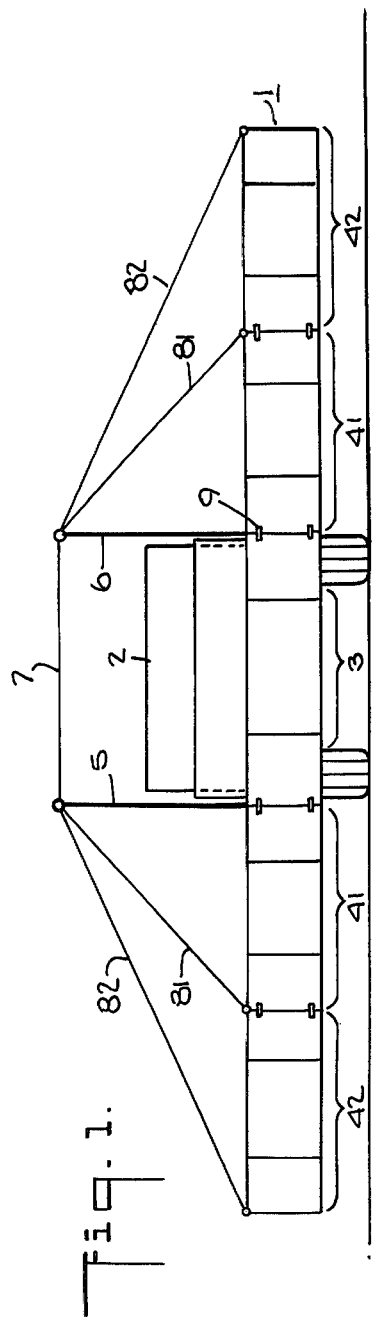

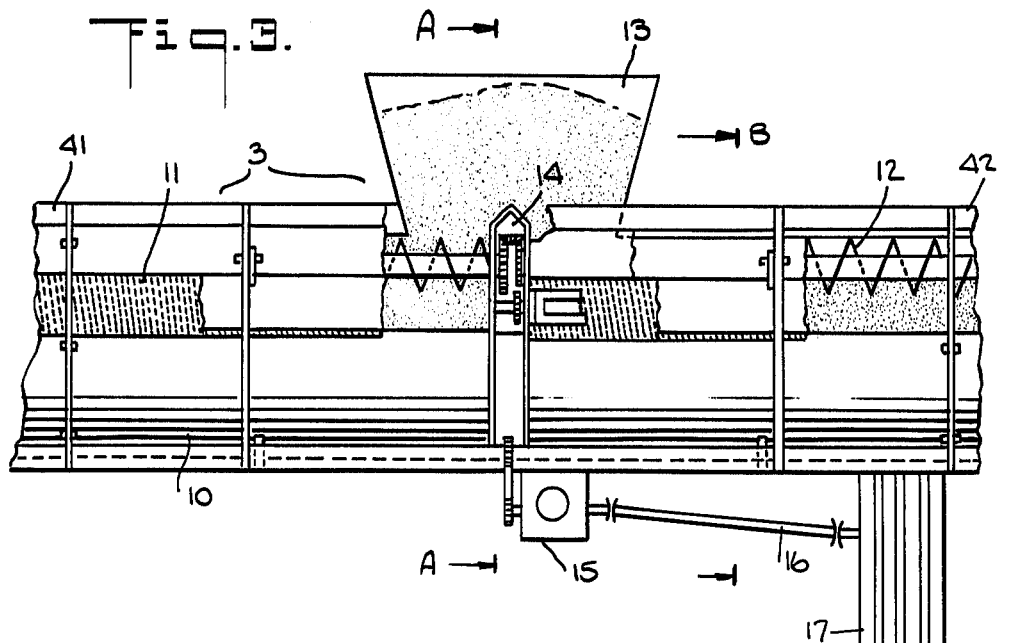
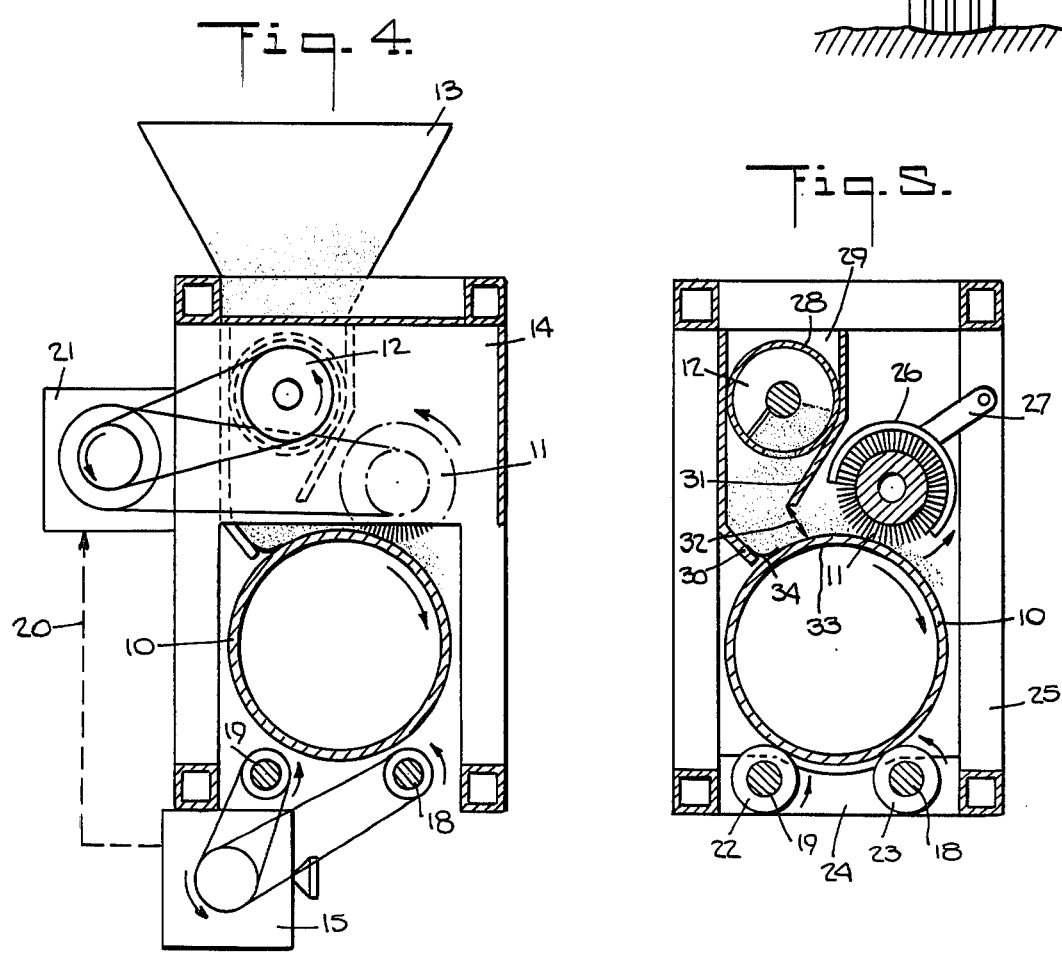

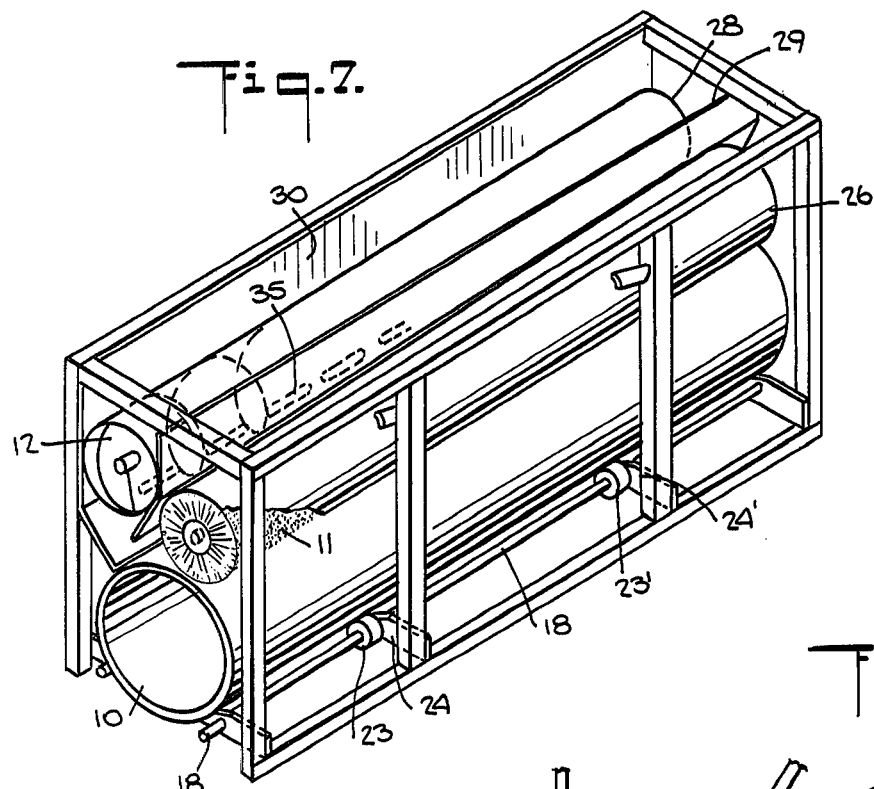
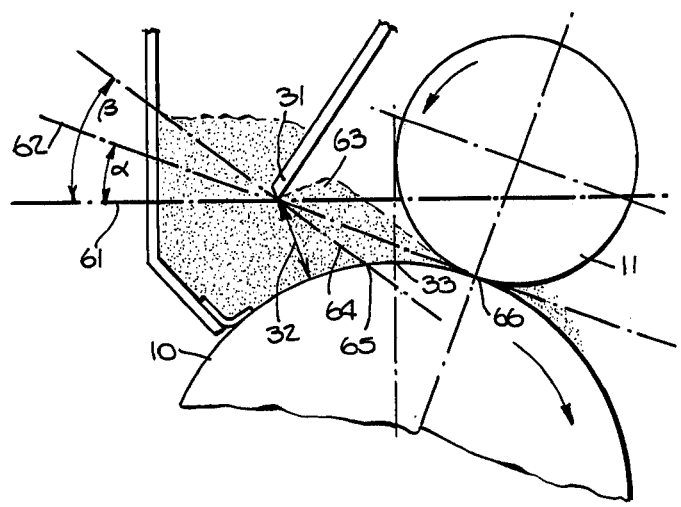
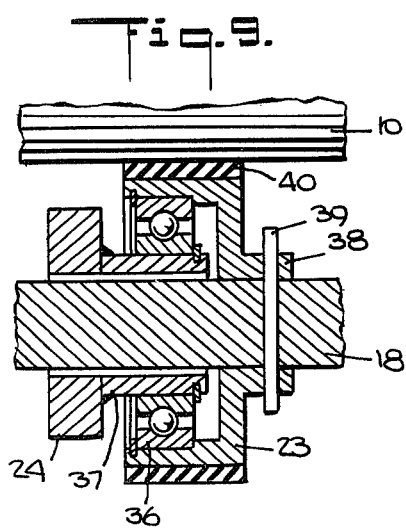
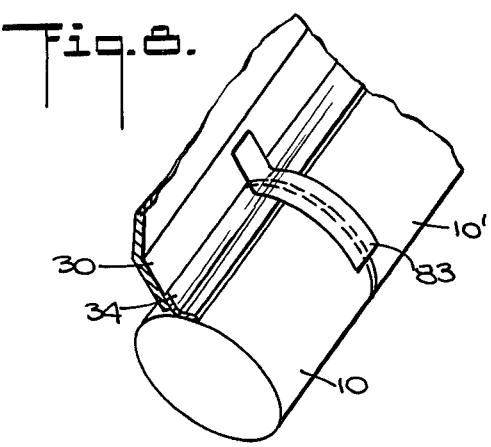
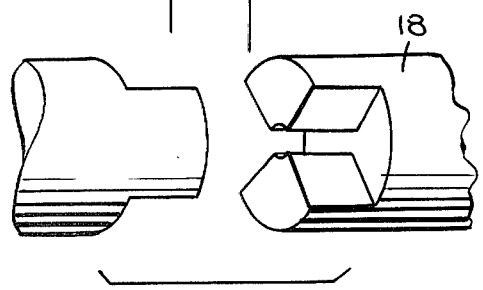

AGRICULTURAL SPREADER DEVICE OF MODULAR DESIGN FOR PULVERULENT MATERIAL

BACKGROUND OF INVENTION

The present invention relates generally to the field of agricultural machinery, and more particularly to an apparatus for spreading pulverulent or granular material such as fertilizer, seeds, plant treatment agents and the like.

Numerous types of apparatus adapted to spread solid material are known operating in accordance with various principles, among which particular mention may be made of projection by purely mechanical means such as disks rotating at high speed, pneumatic means which entrain the material in a stream of air. Also known are devices which effect distribution via a conveyor member which may be a belt, a slide mechanism or a cylinder. In the devices which employ this second principle of operation, the material to be spread is fed by intermediate so-called feed means from a feed hopper to the distribution means.

The present invention relates more specifically to devices which operate in accordance with this second principle and more particularly to the type of devices in which the distributing member is a cylinder. In apparatus of this type, a shaft-mounted cylinder, which may be either ribbed, honeycombed or smooth, is generally a single part supported by a frame on its shaft ends, at one of which ends the rotary drive means is generally located. Moreover, the flow of the material to be spread takes place through a passageway provided between the lower part of an intermediate, so-called distribution hopper and the cylinder; this distance being variable in order to permit the passage of a smaller or larger amount of the material to be spread to thereby adjust the quantity of spread.

The assembly of arrangements referred to above implies a certain rigidity both of the hopper and of the cylinder, which rigidity arises from the thickness of these parts. It will be understood, therefore, that, due both to this thickness and to the shafts, their bearings and regulating means, the entire device possesses a substantial weight which limits its length.

Now it is clear that the operation of spreading over a given surface will be faster, the greater the width of the spreading strips; that is to say, the greater is the length of the spreading device. Thus the problem to which at the present invention is directed is the attainment of a maximum length for a given weight of the spreading device which is compatible with the supporting ability of the agricultural machines.

SUMMARY OF INVENTION

In view of the foregoing, the main object of the present invention is to provide a spreading device having a length (or else a spreading strip width) which is as large as possible for a given weight of the device.

Another object of the invention is to provide a device whose length is modular as a function of the operating requirements and is also variable from one side to the other in the spreading direction.

Still another object of the invention is to provide a device which is both less expensive and less sensitive in operation to small dimensional variations in the position of its members and to hygrometric variations in the ambient air.

Yet another secondary object of the invention is to provide a spreading device which permits the simple adjustment of the quantity spread per unit of surface, regardless of the speed of travel.

Briefly stated, a device in accordance with the present invention for the spreading of pulverulent or granular material comprises a rotary cylinder arranged below a distribution hopper, a feed hopper, feed means for entraining the material to be spread from the feed hopper and causing it to travel into the distribution hopper, and a rotary cylindrical brush applied against the cylinder in order to remove the material to be spread from it, the arrangement being primarily characterized by the fact that the cylinder rests on a plurality of rollers mounted on a frame, at least one of the rollers being preferably capable of functioning as a driving roller in order to rotate the cylinder. From this there results simultaneously a gain in lightness with respect to a suspension and to a centering by axial shaft and bearing, and the possibility of an end-to-end juxtapositioning of a plurality of cylinders.

In accordance with another feature of the invention, the brush rests on the cylinder and is contained within a semicylindrical housing and is centered thereby, which housing is integral with the frame. Thus in addition to the advantages mentioned above with respect to the cylinder, the brush contributes to holding the cylinder on its rollers.

In accordance with yet another feature of the invention, a spreading device such as indicated above wherein the feed means are of the known helicoidal ramp type, is furthermore characterized by the fact that the helicoidal ramp is an Archimedes screw or worm contained for rotation within a cylindrical tube located in and rigidly fastened to the distribution hopper, this tube being provided with openings on at least one lower generatrix of its wall, with the result that the tube constitutes a feed channel as well as a means for supporting the screw in the hopper.

In accordance with still another feature of the invention, the spreading device which is drawn by an agricultural vehicle is collapsible into a "highway" position and is furthermore characterized by the fact that it comprises a carrier element and a plurality of lateral modular elements, each lateral element being adapted to be fastened either at the end of the carrier element or at the end of an identical lateral modular element. Thus a spreading device in accordance with the invention is composed of a carrying element which can be attached to an agricultural vehicle and includes means for driving the shafts of the modular elements which can be linked to its ends. Due to the attachment on one side or the other of the carrying element, of a variable number of modular elements, one can adjust either symmetrically or asymmetrically, the length of the spreading device. One can also, in the event of failure of a modular element, replace it by an identical spare element. Moreover, one can from time to time purchase modular elements in order to increase the productivity of the device. Finally, by disengaging the drive rollers of a given modular element, one can render the cylinder of that element non-rotating and thereby effect a spreading in alternate strips.

In accordance with another characteristic of the invention, transmission means act to transmit from a bearing wheel on the ground forming part of the vehicle or a wheel especially intended for such transmission, the movement of rotation to the said driving roller and at the same time to the feed means and to the brush. These means are of variable step-down ratio type or of the step-wise variation type based on a "gear box" or of the continuously variable type also known as "variator." In accordance with this characteristic, the adjustment of the quantity of material to be spread is effected by the variation of the step-down ratio of the transmission means and not, as is known in the prior art, by modifying the width of passage at the bottom of the feed hopper.

Finally, the device in accordance with the invention comprises an elongated opening located at the base of the distribution hopper, formed by two lips referred to as the anterior and posterior lips respectively, the posterior lip being the one below which the material to be spread moves upon the rotation of the cylinder. It is furthermore characterized in general by the fact that the so-called posterior lip is on the one hand located above the cylinder at a distance from the latter definitely greater than the greatest dimension of the largest particles of the material to be spread and is, on the other hand, definitely offset with respect to the top of the cylinder towards the side of the anterior lip so that the angle formed by the horizontal and a line extending from the end of the posterior lip and tangent to the cylinder on the brush side is less than the angle of natural talus slope of material to be spread; namely, about 20 degrees.

As a result of this arrangement of the posterior lip, first one need not fear clogging of the opening by large particles or foreign substances. Second, the flow of the material to be spread through the opening is limited, by its natural talus slope, to the quantity displaced by the rotation of the cylinder. This arises from the fact that the distance from the posterior lip to the cylinder is definitely greater than in prior-art devices and that the relative variation of this distance as a result of wear or jolts is rather small and therefore has little effect on the flow of the material.

It is therefore to be noted that the essential difference between the prior art devices and the present device resides in the fact that, in accordance with the invention, the opening or passage is of fixed dimensions defined by the construction and therefore not capable of undergoing variations during operation.

OUTLINE OF DRAWINGS

For a better understanding of the invention as well as other objects and further features thereof, reference is made to the following detailed description to be read in conjunction with the accompanying drawings, wherein:

FIG. 1 is an elevational view as seen from the rear of a spreading device in accordance with the invention mounted on a tractor;

FIG. 2 is a similar showing in top view;

FIG. 3 is a partial section taken through the central part of the spreader;

FIG. 4 is a diagrammatic section taken in the plane indicated by line AA of FIG. 1;

FIG. 5 is a diagrammatic section taken in the plane indicated by line BB of FIG. 1;

FIG. 6 is a diagrammatic showing serving to explain a characteristic arrangement of the device of the preceding figures;

FIG. 7 is a perspective view, partially broken away, of a modular assembly;

FIG. 8 is a perspective view of a covering tongue of the ends of the cylinders;

FIG. 9 is a section through a drive roller;

FIG. 10 is a perspective view of a coupling member;

DESCRIPTION OF INVENTION

Figure 11:
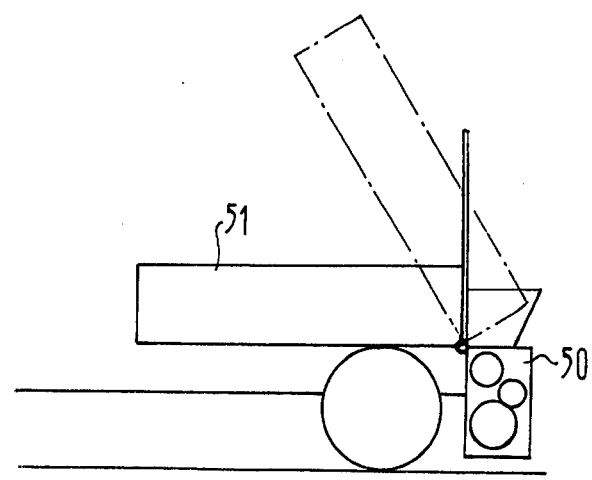
FIG. 11 is a diagrammatic illustration of one method of fastening the spreader of the invention to an agricultural tractor of known type.

In FIGS. 1 and 2, there is shown a spreading device, generally designated by numeral 1, in accordance with the invention installed at the rear end of an agricultural vehicle such as the tractor 2. The device is composed of a central carrying element 3 and modular side elements 41, 42. Elements 41 and 42 are identical and are distinguished only by their position with respect to the carrying element 3. Thus elements 41 are fastened to the end of carrying element 3 and extend laterally therefrom, while elements 42 are fastened to the ends of elements 41.

Although a symmetrical arrangement of the lateral elements on both sides of the carrying element has been shown in the drawings, it is to be understood that in practice a single side element could be fastened to one end of the carrying element, while three side elements could be fastened end-to-end to the other end of the carrying element. Alternatively, a single side element could be fastened to each end of the carrying element. This possibility, as well as that of interchanging the side elements in their respective positions, defines the modular character of these elements or assemblies.

In FIG. 1, it will be noted that masts 5 and 6, connected transversely by a tie member 7, act to support the side elements by means of the shrouds 81,82 etc . . . in such a manner as to maintain the side elements aligned. It will be further noted in FIG. 2 that the side elements can pivot in a horizontal plane around the masts, which form hinges, so as to be able to be collapsed alongside the vehicle when travelling on the highway.

Means for temporary fastening the side elements to each other or to the carrying element are indicated symbolically at 9; these means which are known, per se, can be of the hole and pin type, "dove-tail" type, etc.

In FIG. 3, it will be seen that the carrying or central element 3 supports, at its ends, side elements 41 and 42; and that it further includes spreading members such as cylinder 10, brush 11 and worm screw 12, which members will be described in further detail in connection with the figures to follow. Also included are a feed hopper 13 (which is indicated by the same reference number in FIG. 2), a housing 14 for enclosing drive means for rotating the brush and screw, and transmission means 15 for transmitting the movement of a bearing wheel 17 to the drive means as well as to the means for driving and rotating cylinder 10 via a shaft 16; for example, a universal shaft. The box shown at 15 is essentially a variator which makes it possible to adapt the ratio of the speeds of rotation of the members indicated above to the speed of rotation of the carrier wheel; that is to say, to the speed of travel of the spreader over the ground.

In FIG. 4, there are diagrammatically indicated the drive means for the members indicated above, these means being housed in housing 14 of the preceding figure or being located above the latter. Box 15 transmits the rotary movement of the bearing wheel to shafts 18 and 19 which drive rollers supporting cylinder 10 (not shown in the figure) and at the same time by transmission means which are indicated symbolically by the dashed lines 20, to the means 21 for driving brush 11 and worm 12. In practice, means 21 may also be transmission means having a variable ratio.

From a comparative examination of FIGS. 3 and 4, it will be noted that housing 14 does not interfere with the structure of the cylinder 10 but its only located in the upper part of the device. Housing 14 is intended to shelter the drive pinions of the brush and the worm from the pulverulent material. The shafts of the latter two members pass through the side walls of the housing 14, as is clearly visible in FIG. 3. The upper end of housing 14 has a ridge or bow shape so as to facilitate the flow of the granular material on either side of the housing; it will be noted that the drive means for the cylinder 10 are sheltered from the granular material by the cylinder itself.

FIG. 5 is a cross section through the bearing element in the vicinity of one of its ends, but which could just as well be a cross section through a side element. It will be seen in FIG. 5 that cylinder 10 rests on rollers 22 and 23. Rollers 22 and 23 are mounted for rotation on a lower crossmember 24 of frames 25. Rollers 22 and 23 are caused by their shafts 18 and 19, respectively, to operate as driving rollers, and they can thereby rotate cylinder 10.

Cylindrical brush 11 rests on cylinder 10 and it is contained and centered within a semicylindrical housing 26 secured to the frame via arms such as 27. As is evident from the preceding figures, brush 11 is driven to rotate at a speed which is preferably greater than that of the cylinder.

Worm 12 acting as a feed means is housed for rotation in a cylindrical tube 28 securely attached to and located in a distribution hopper 29. It is to be understood that worm 12 can turn on itself within tube 28 which remains stationary with respect to hopper 29.

Hopper 29 has an anterior lip 30 and a posterior lip 31, the end of posterior lip 31 together with cylinder 10 defining an elongated opening 32 through which the granular material can flow. It will be noted that anterior lip 30 is provided with a flexible rim 34 resting on the cylinder so as to assure tightness between the lip and the cylinder, and that posterior lip 31 is located above the cylinder 10 at a distance 32 from the latter which is definitely greater than the largest dimension of the largest particles of the material to be spread. Furthermore, lip 31 is distinctly shifted towards the side of the anterior lip 30 with respect to the generatrix 33 of the apex of the cylinder.

In FIG. 6, which is to be compared with the preceding figure, an arrangement of posterior lip 31 with respect to the top 33 of the cylinder is characteristic of a device in accordance with the invention in that the angle $\alpha$ formed by the horizontal line 61 and a line 62 extending from the end of the lip 31 in order to be tangent to the cylinder 10 on the side of the brush 11 is less than the angle $\beta$ of the slope of the natural talus of the material to be spread. Thus the talus is shown in dashed line 64. Even the foot 65 of the talus is preferably located between the hopper and the top 33 of the cylinder. This eliminates practically any risk of leakage of the material to be spread when the cylinder is not turning. Also, the point of application 66 of brush 11 to cylinder 10 is located in the vicinity of the point of tangency of the straight line 62.

It will also be seen in FIG. 6 that as cylinder 10 rotates, the material to be spread is deposited on the cylinder in a layer 63 of constant thickness, equal to the fixed distance 32 between the cylinder 10 and the end of the posterior lip 31.

In FIG. 7, a side element, a cross section of which may be identical to the end cross section of the carrying element shown in FIG. 5, comprises for this reason component members designated by the same reference numbers. It is composed primarily of a cage of profiled bars formed of lengthwise members, upright members, and cross members; a pair of lower cross members 24 and 24' to support rollers 23 and 23' on which the cylinder 10 rests. A distribution hopper is defined by an anterior lip 30 and by a posterior lip 31, each formed of a folded plate welded to the cage. In the distribution hopper there is contained tube 28 housing worm 12. Tube 28 is provided on its lower generatrix with a plurality of holes such as 35, these holes being intended to permit the pulverulent material to fall into hopper 29 under the push of a worm. It will be noted with respect to the drive of the worms that the latter is advantageously reversed on one side of housing 14 (FIG. 3) with respect to the other side so that worms of the same direction of pitch can be used indiscriminately on one side or the other of the device.

Brush 11 is housed in its semicylindrical housing 26 from which it can be removed through one or the other of its ends. It is to be noted that cylinder 10, brush 11 and worm 12 can all be withdrawn axially from the cage, in which there then remain, aside from rollers 23 and 23', only static members.

In FIG. 8 a tongue 83, formed of a flexible material, extends the flexible rim 34 of anterior lip 30 so as to cover the ends of two adjacent cylinders 10 and 10' and to prevent a leak of material between the cylinders. The flexible material of which the tongue as well as the flexible lip rim may be formed is, for instance, a rubberized cloth.

In FIG. 9, which illustrates the mounting of a roller on the cage, a roller such as 23 in the preceding figure, is centered externally on a ball bearing 36 which is in turn centered internally on a hollow bearing 37 integral with the lower cross member 24. Shaft 18 passes through the lower cross member, the hollow bearing and the ball bearing and is made integral with a hub 38 of the roller 23 by means of a pin 29, the removal of which results in the disengagement of the roller. The periphery of roller 23 is advantageously covered with rubber in order to form a travel strip 40 which assures an anti-skid drive of cylinder 10, which can itself have an anti-skid surface.

FIG. 10 shows a "crenelated" coupling means by which the ends of the shaft of the worm, the core of the brush and the drive shafts of the rollers, such as shaft 18, can be provided in order to drive the corresponding members of an adjacent modular element, which may be the central carrying element or a lateral element driven by the latter.

There will now be described the placing in operation and the operation of a device in accordance with the invention in such a manner that they can be understood from an examination of the preceding drawings taken together. The central carrier element is fastened by suitable means to an agricultural vehicle and its drive means are connected to a bearing wheel, which will transmit its movement of rotation to them.

Thus to each of the ends of the carrier element there is linked a lateral element; the shafts of the worm and of the brush and the bearing roller shafts are each placed in engagement with the ends of the shaft of the corresponding member of the carrier element. This engagement is effected, for example, by means of crenelated devices; thereupon, for instance, to each lateral element. Mounted on the lateral element there is linked in the same way a second lateral element. One thereby arrives at the mounting of four lateral elements shown in FIGS. 1 and 2. Care is then taken to align the lateral elements by means of turnbuckles incorporated in the shrouds.

The feed hopper is loaded with pulverulent or granular material which is to be entrained by a worm until the distribution hopper is full over its entire length since, as the level increases in the distribution hopper, the holes in housing tube 2 will become plugged by the material itself. A disengageable drive for the worm can advantageously be provided by a torque limiter in such a manner that the worm stops turning after the distribution hopper is entirely full. The cylinder will be placed in operation over the field to be spread, and, by means of the variator or the gear box, one will effect an adjustment of the amount of material spread; the rate of flow of material spread being proportional to the height of the bed of material formed at the top of the cylinder, or else to the radial distance between the end of the posterior lip and the cylinder and to the speed of rotation of the cylinder or else, for a given adjustment of the cylinder/bearing-wheel speed ratio, the rate of flow is proportional to the speed of travel. Accordingly, the quantity spread per unit of surface traversed stays constant. When stopped, of course, no material flows.

In order to make it clear why the spreader device is very light as compared to the existing devices, it will be noted that the diameter of the cylinder is on the order of about 20 cm, this cylinder being advantageously of aluminum alloy or plastic, that the opening or passage for the material to be spread between the posterior lip and the cylinder is 3 to 5 cm, that the diameter of the worm is about 10 cm, and that the diameter of the brush is about 15 cm, and the height of the cage is about 50 cm, its width 30 cm and its length 200 cm.

Thus it is evident that ordinary shrouds can support up to three elements aligned in end-to-end relation on the same side of the central element, and that an agricultural tractor can in this manner support seven elements extending end-to-end over about 15 meters.

It will also be noted that the principal members are not specially made precision parts and that their mounting and removal are effected by simple plugging. As a consequence, the cost of manufacture is modest, and the mounting of the spreader and its use and maintenance is uncomplicated.

Finally, it will be noted that at the end of the shaft there are modular end-of-plate elements intended on the one hand to axially lock the different rotary members and on the other hand to prevent any possible excess of material to be spread from arriving at the end of the feed worms. In the case of spreading by alternate strips, one can advantageously provide the device with intermediate plates which are not as high as the preceding ones so that they do not interfere with the worm but serve as partitions between rotating cylinders and non-rotating respectively. These intermediate plates are not shown in the drawing, their arrangement and operation being covered by the above explanations. It will also be noted that the feed hopper may advantageously contain a grid intended to retain large foreign bodies.

In FIG. 11 a spreader in accordance with the invention indicated very diagrammatically by a cage 50 containing its worm, its brush and its cylinder, is fastened to the rear of an agricultural tractor having a dump bucket 51.

Figure 12:
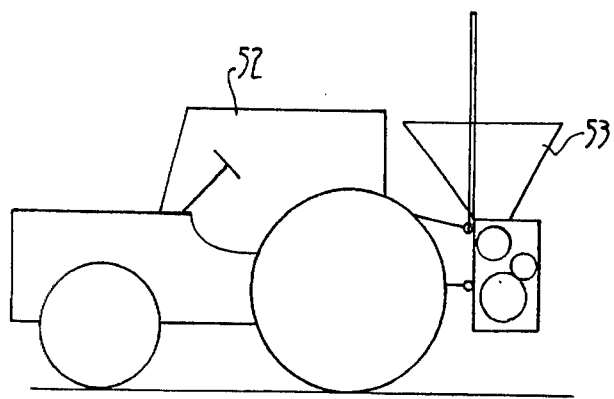
FIG. 12 is a diagrammatic illustration of another method of attaching the spreader of the invention to an agricultural tractor.

In FIG. 12 a spreader in accordance with the invention is suspended directly from the three-point adapter of an agricultural tractor 52. The large size of a feed hopper 53 in this arrangement will be noted.

Figure 13:
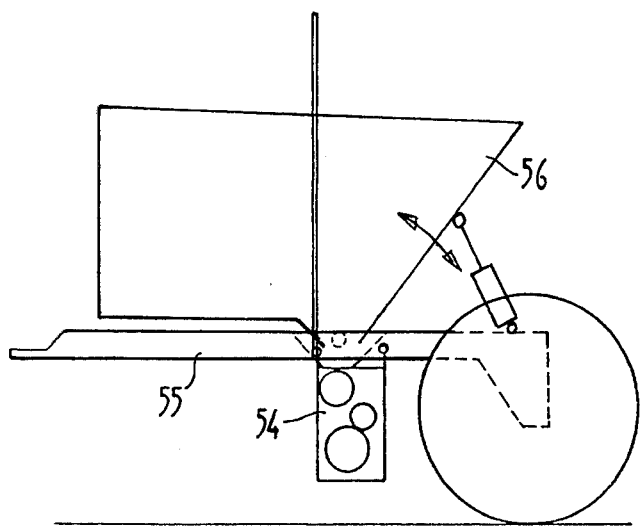
FIG. 13 is a diagrammatic illustration of still another method of attaching the spreader of the invention to a tractor especially designed for the spreader.

In FIG. 13, a spreader 54 in accordance with the invention is suspended below the frame 55 of a tractor especially designed for spreading, and having a bucket 56 of large capacity which can be inclined, for instance, by hydraulic means.

While there has been shown and described a preferred embodiment of an agricultural spreader device of modular design for pulverulent material in accordance with the invention, it will be appreciated that many changes and modifications may be made therein without, however, departing from the essential spirit thereof.

We claim:

1. An agricultural device adapted to spread pulverulent or granular material such as seed or fertilizer, said device having at least one operating assembly comprising:
   (A) a plurality of rollers supported on a frame, at least one roller being a drive roller;
   (B) a cylinder disposed within said frame and resting on said rollers, said cylinder being caused by the drive roller to rotate;
   (C) a distribution hopper for distributing material fed thereto across the top surface of the rotating cylinder; and
   (D) a rotary brush adjacent said hopper on the discharge side of the cylinder and engaging said cylinder to discharge the material from the surface thereof.

2. A device as set forth in claim 1, wherein said drive roller is caused to rotate by rotary power applied thereto.

3. A device as set forth in claim 2, wherein said brush is shaft-mounted and is contained and centered within a semi-cylindrical shell secured to said frame, said brush engaging the upper surface of the cylinder to maintain the cylinder on said rollers.

4. A device as set forth in claim 3, wherein said distribution hopper has feed means disposed therein constituted by a shaft-mounted worm rotating within a cylindrical tube provided with a series of openings therealong, the worm drawing material from a feed hopper and discharging it through said openings into the distribution hopper.

5. A device as set forth in claim 3, adapted to be carried by an agricultural vehicle and including an operating assembly functioning as a central bearing assembly and a plurality of laterally-extending operating assemblies of modular form, each capable of being operatively linked to either end of the bearing assembly or to the end of an identical modular assembly.

6. A device as set forth in claim 5, wherein the modular assemblies carried by the vehicle are collapsible for highway travel.

7. A device as set forth in claim 5, wherein the drive rollers of the assemblies are each coupled to a drive shaft by a retractable pin the withdrawal of which releases the drive roller, whereby the cylinder in the bearing assembly and any cylinder in the modular assemblies may be selectively rendered non-rotating.

8. A device as set forth in claim 5, wherein the shafts in each operating assembly for turning the drive roller, the brush and the worm therein are rotated by corresponding shafts in a neighboring assembly.

9. A device as set forth in claim 5, wherein said vehicle is provided with a ground-engaging wheel whose rotation is transmitted through a variable step-down ratio mechanism to said drive roller, said brush and said worm, whereby by varying the ratio one is able to adjust the amount of material being spread.

10. A device as set forth in claim 1, wherein said distribution hopper has an elongated opening to discharge the material across the top surface of the cylinder, which opening is defined by anterior and posterior lips, the posterior lip being raised relative to the top surface of the cylinder whereby the material to be spread flows therebelow upon rotation of the cylinder.

11. A device as set forth in claim 10, wherein said posterior lip is spaced from the cylinder surface by a distance substantially larger than the largest dimension of the largest particles of said material.

12. A device as set forth in claim 11, wherein said posterior lip is inclined toward the side of the anterior lip whereby the flow of materials through the opening of the hopper is limited by its natural talus slope.

13. A device as set forth in claim 12, wherein the angle defined by a horizontal axis and a line extending from the end of the posterior lip is tangent to the surface of the cylinder at the point at which the brush engages the surface thereof is less than the angle of said talus slope.

14. A device as set forth in claim 9, wherein said vehicle is a tractor.

* * * * *